(12) United States Patent
Carlson et al.

(10) Patent No.: US 7,712,614 B2
(45) Date of Patent: May 11, 2010

(54) BICYCLE FRAME CLAMP ADAPTOR

(75) Inventors: Christopher Robert Carlson, Madison, WI (US); Tyler Jay Pilger, Sun Prairie, WI (US); Jeffrey Scott Small, Watertown, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 337 days.

(21) Appl. No.: 11/744,520

(22) Filed: May 4, 2007

(65) Prior Publication Data

US 2008/0272264 A1 Nov. 6, 2008

(51) Int. Cl.
*A47F 7/00* (2006.01)
(52) U.S. Cl. ............... 211/22; 248/176.1; 248/121; 248/230.1; 224/420; 269/95; 269/909; 211/89.01
(58) Field of Classification Search ............ 248/230.1, 248/230.4, 229.2, 229.23, 229.24, 230.5, 248/121, 176.1, 125.1; 224/42.45 R, 42.38, 224/400, 420, 412, 419, 427, 536; 211/86.01, 211/89.01, 22, 8; 269/95, 96, 97, 64, 68, 269/909; 24/455; 81/3.44
See application file for complete search history.

(56) References Cited

U.S. PATENT DOCUMENTS

| | | | |
|---|---|---|---|
| 559,312 A | 4/1896 | Seely | |
| 564,733 A | 7/1896 | Beardsley | |
| 577,910 A | 3/1897 | Bierbach | |
| 588,291 A | 7/1897 | Porter | |
| 592,534 A | 10/1897 | Webster et al. | |
| 592,544 A | 10/1897 | Graham et al. | |
| 594,627 A | 11/1897 | Hewlett | |
| 605,429 A | 6/1898 | Howard | |
| 619,186 A * | 2/1899 | Kingsbury | 211/22 |
| 640,631 A | 1/1900 | Conti | |
| 653,519 A | 7/1900 | Masters | |
| 3,514,091 A * | 5/1970 | Johnson et al. | 269/68 |
| 3,675,784 A | 7/1972 | John | |
| D229,132 S | 11/1973 | Uroshevich | |
| 3,981,491 A * | 9/1976 | Snyder | 269/64 |
| 4,040,613 A | 8/1977 | Kartasuk et al. | |
| 4,073,418 A * | 2/1978 | Edson | 81/3.44 |
| 4,234,176 A | 11/1980 | Goff et al. | |
| 4,395,070 A | 7/1983 | Veltman et al. | |
| 4,431,174 A | 2/1984 | Varden | |
| 4,503,743 A | 3/1985 | Ryba | |
| D280,088 S | 8/1985 | Shedden | |
| 4,569,510 A | 2/1986 | Haramoto | |
| 4,763,887 A | 8/1988 | Yang | |
| 4,765,033 A | 8/1988 | Hollingsworth | |
| 4,809,962 A | 3/1989 | Lee | |
| 4,910,986 A | 3/1990 | Funkhouser | |
| 4,971,301 A | 11/1990 | Yang | |

(Continued)

*Primary Examiner*—J. Allen Shriver
*Assistant Examiner*—Todd M. Epps
(74) *Attorney, Agent, or Firm*—Boyle Fredrickson, S.C.

(57) ABSTRACT

An adapter includes a first arm and a second arm that is pivotably connected to the first arm. A first portion of the first and second arms cooperate to form a contour which generally matches a contour of a portion of a bicycle frame. A second portion of the first and second arms are constructed to engage one another such that, during a clamping process, the adapter engages the bicycle frame with a desired gripping pressure. Preferably, the gripping pressure is less than a pressure that would crush or otherwise deform the frame of the bicycle.

15 Claims, 4 Drawing Sheets

U.S. PATENT DOCUMENTS

| | | | |
|---|---|---|---|
| 5,032,045 A | 7/1991 | Calco | |
| D330,695 S | 11/1992 | Simmons | |
| 5,165,635 A | 11/1992 | Hoshino | |
| 5,320,227 A * | 6/1994 | Minoura | 211/22 |
| 5,385,280 A | 1/1995 | Littlepage et al. | |
| D356,901 S | 4/1995 | Schoenig et al. | |
| D358,048 S | 5/1995 | Schoenig et al. | |
| 5,497,967 A | 3/1996 | Gantois | |
| 5,509,629 A | 4/1996 | Sassmannshausen et al. | |
| 5,562,013 A * | 10/1996 | Kao | 74/551.3 |
| 5,702,006 A | 12/1997 | Durham | |
| 5,709,521 A * | 1/1998 | Glass et al. | 414/462 |
| 5,765,821 A * | 6/1998 | Janisse et al. | 269/16 |
| 5,779,116 A * | 7/1998 | Rosch et al. | 224/324 |
| 5,779,119 A * | 7/1998 | Talbot et al. | 224/427 |
| 5,876,026 A * | 3/1999 | Chen | 269/156 |
| 5,897,109 A | 4/1999 | Lin | |
| 5,996,814 A * | 12/1999 | Workman et al. | 211/22 |
| 6,027,133 A | 2/2000 | Phillips | |
| 6,092,797 A | 7/2000 | You | |
| 6,135,435 A | 10/2000 | Schmitz | |
| 6,227,081 B1 * | 5/2001 | Bally et al. | 81/389 |
| 6,273,392 B1 | 8/2001 | Birkhold | |
| 6,334,609 B1 | 1/2002 | Chun | |
| 6,371,309 B1 | 4/2002 | Smith | |
| 6,375,135 B1 | 4/2002 | Eason et al. | |
| 6,449,919 B1 * | 9/2002 | Behlen | 52/699 |
| 6,454,228 B1 | 9/2002 | Bosnakovic | |
| 6,568,644 B2 * | 5/2003 | Pedersen | 248/229.13 |
| 6,619,644 B1 | 9/2003 | Liou | |
| D490,289 S | 5/2004 | Chuang | |
| 6,761,349 B2 | 7/2004 | McCraw | |
| 6,789,772 B2 | 9/2004 | Eason | |
| 7,234,219 B2 * | 6/2007 | Deiter | 29/426.5 |
| 2003/0102343 A1 * | 6/2003 | Anderson et al. | 224/536 |
| 2004/0046091 A1 * | 3/2004 | Chuang | 248/125.1 |
| 2005/0035247 A1 | 2/2005 | Roberts et al. | |
| 2005/0056740 A1 * | 3/2005 | Chuang | 248/176.1 |
| 2009/0057973 A1 * | 3/2009 | Henderson | 269/95 |

* cited by examiner

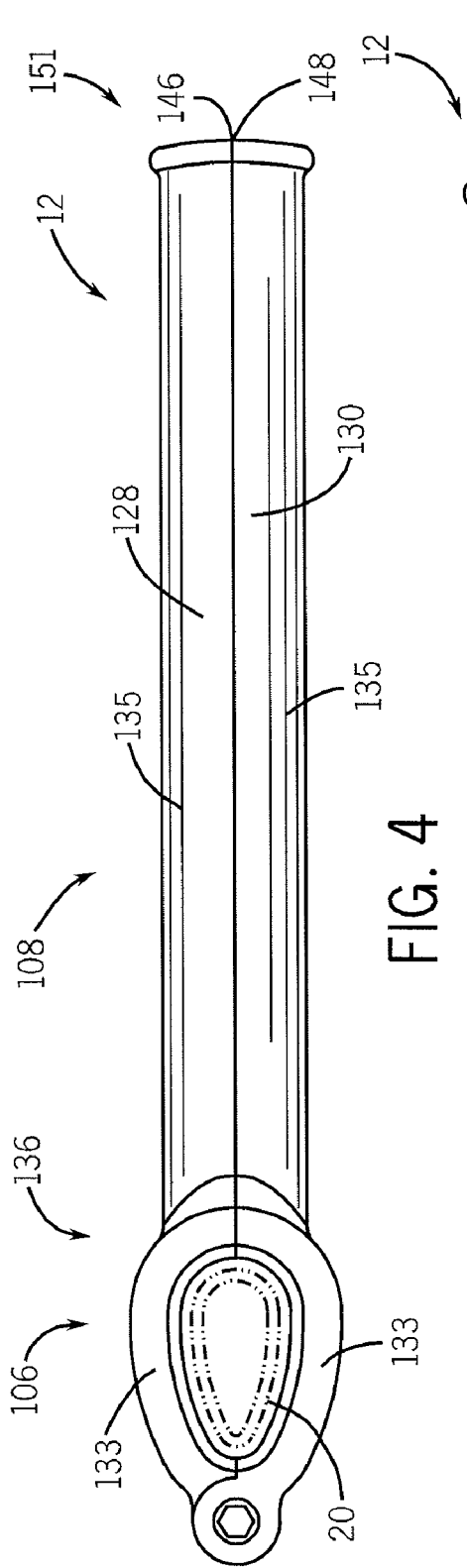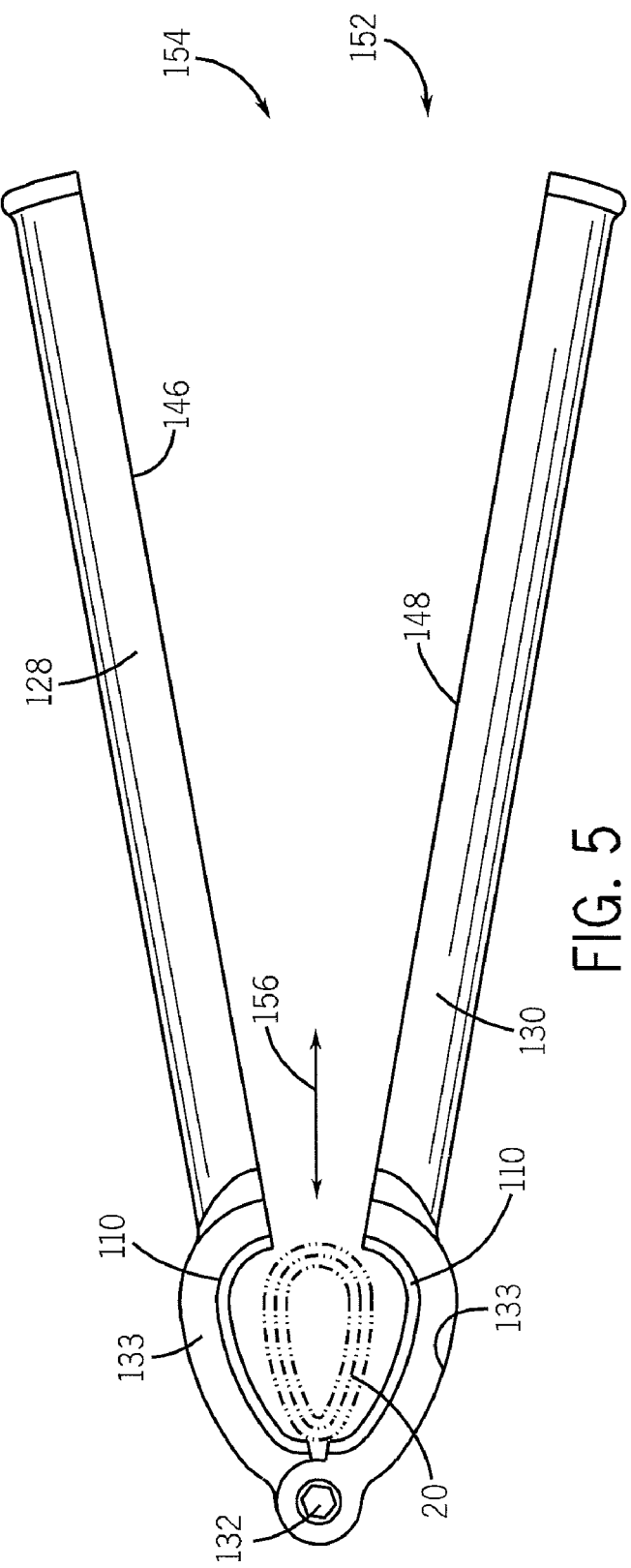
FIG. 4
FIG. 5

BICYCLE FRAME CLAMP ADAPTOR

BACKGROUND OF THE INVENTION

The present invention relates generally to bicycles and, more particularly, to an adapter constructed to be operatively disposed between a repair clamp and a bicycle.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The handlebars, accessories, front and rear wheel assemblies, and drive assembly of the bicycle are attached to the respective portions of the frame. Occasionally, these systems require periodic maintenance or repair. Frequently, it is desired to suspend the bicycle from the frame to manipulate any of the various components that are commonly supported by the frame. Often, a technician or user uses a clamp or repair clamp that is constructed to engage the frame of the bicycle and suspend the bicycle above the ground. The repair clamps come in a variety of configurations. Some include a movable jaw that compresses an area of the frame of the bicycle between the moveable jaw and a fixed jaw. Others provide an expandable jaw that is constructed to be received within a cavity of the frame, such as the seat tube, and expanded therein. Each of these clamp types are not without their respective drawbacks.

The expandable type of clamp requires the removal of a structure of the bicycle to expose the frame cavity. That is, for the clamp to engage the seat tube, the seat post must be removed from the seat tube. Such requirements increase the service time associated with using such types of clamps. The moveable jaw types of clamps also present several drawbacks to their utilization. It is commonly desired to engage the clamp proximate a gravitational axis of the bicycle to prevent tipping of the clamp supporting structure and to evenly distribute the weight of the bicycle across the structure of the clamp. A user must commonly elevate a bicycle to engage it with the clamp. Mounting the bicycle in a balanced orientation in the clamp requires the user to offset their gripping of the frame such that their hands do not interfere with the engagement of the clamp with the frame. Additionally, once positioned loosely in the clamp, the user must maintain the position of the bicycle with one hand while manipulating the clamping operation of the clamp with the other hand. Such activity can be trying and the user is generally wary that inadvertent translation of the bicycle relative to the clamp jaws can mare or otherwise blemish the finish of the frame of the bicycle Another consideration of such clamp systems is the structure of the bicycle frame. Commonly, such clamps are provided with generally planar or only slightly curved jaw faces. Although such clamps are adequate to provide sufficient clamping forces for generally round frame structures, the advent of non-round bicycle frame structures has presented several additional shortcomings of these clamping devices.

Many bicycle manufactures provide frame or bicycle elements formed from carbon fiber materials. The carbon fiber materials are used to provide lightweight durable frame structures. In addition to the strength of the material, many prefer carbon fiber materials for the ability to easily form elements having a non-circular cross-section. To increase the aerodynamic performance of the bicycle, bicycles have been provided with frame, seat tube, and seat post assemblies formed of carbon fiber material in an aerodynamic shape. These shapes generally include a teardrop, airfoil, or other non-circular sections. Although such structures enhance the aerodynamic function of the bicycle, they also complicate usage of the clamping devices.

Due in part to the non-corresponding contours of the frame sections and the clamp jaws; such frame elements are susceptible to damage due to over clamping. That is, as a user increases the clamping pressure in an effort to secure the frame element in the clamp, the un-matching contours of the clamp and the frame concentrate the clamping forces in the areas of contact between the clamp and the frame. Such over clamping can readily be seen as a deformation or other marring in metal material frame elements and can even result in total failure of carbon fiber frame elements. Accordingly, it is desired to provide an adapter that has a contour that generally matches the contour of a frame element. It is also desired to provide an adapter that limits the clamping force that can be imparted to a portion of a bicycle frame.

BRIEF DESCRIPTION OF THE INVENTION

The present invention provides an adapter assembly that overcomes the aforementioned drawbacks. An adapter according to a number of aspects of the invention includes a first arm and a second arm that is pivotably connected to the first arm. A first portion of the first and second arms cooperate to form a contour which generally matches a contour of a portion of a bicycle frame. A second portion of the first and second arms are constructed to engage one another such that, during a clamping process, the adapter engages the bicycle frame with a desired gripping pressure. Preferably, the gripping pressure is less than a pressure that would crush or otherwise deform the frame of the bicycle.

One aspect of the invention discloses a bicycle clamp adapter that includes a first arm and a second arm pivotably connected to the first arm. Each first arm and second arm has a frame section and a clamp section. The frame sections are constructed to cooperate to grip a frame portion of a bicycle and the clamp sections are constructed to engage a clamp and define a maximum grip pressure of the frame sections. Such a construction prevents unintentionally over clamping of the frame portion.

A bicycle support device according to another aspect of the invention is disclosed that includes a first portion that is constructed to engage a seat post of a bicycle and a second portion that is constructed to engage a bicycle clamp. The first portion and the second portion are connected such that when the first portion is engaged with the seat post, the second portion extends in a crossing direction from an axis of the seat post. Such a construction allows a user to conveniently manipulate the position of the bicycle with the support device.

A further aspect of the invention is disclosed as a method of forming a bicycle repair stand adapter. The method includes forming a first section and a second section. The first section is formed with a contour that generally matches a contour of a portion of a bicycle frame and the second section is formed to extend from the first section and constructed to be engaged by a repair clamp. A pivotable link is formed such that the first and second sections can be opened to allow the bicycle frame to pass therebetween and closed to generally surround the bicycle frame.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 4 is a top plan view of the clamp adapter shown in FIG. 1 with the adapter oriented in a closed position about a seat stem of the bicycle.

FIG. 5 is a view of the adapter similar to FIG. 4 with the clamp adapter oriented in an open position.

DETAILED DESCRIPTION OF THE PREFERRED EMBODIMENT

Figure 1:
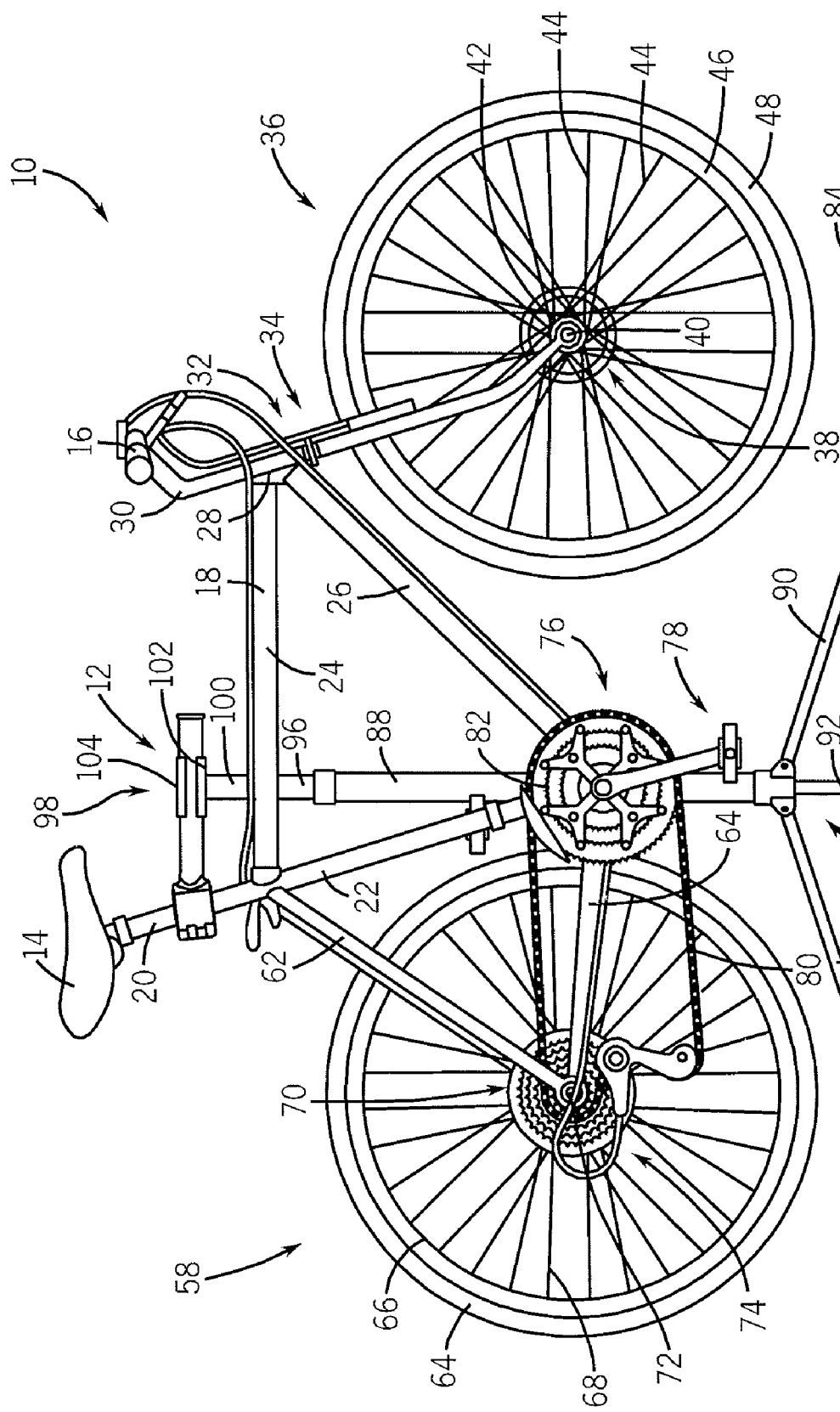
FIG. 1 is an elevational view of a bicycle equipped with a clamp adapter according to the present invention and elevated by a repair stand.

FIG. 1 shows a bicycle 10 engaged with a clamp adapter or adapter 12 according to the present invention. Bicycle 10 includes a seat 14 and handlebars 16 that are attached to a frame assembly 18. A seat post or seat stem 20 is connected to seat 14 and slidably engages a seat tube 22 of frame assembly 18. A top tube 24 and a down tube 26 extend forwardly from seat tube 22 to a head tube 28 of frame assembly 18. Handlebars 16 are connected to a stem 30 that passes through head tube 28 and engages a fork crown 32. A pair of forks 34 extend from generally opposite ends of fork crown 32 and are constructed to support a front wheel assembly 36 at an end of each fork or a fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 58 is rotationally attached to bicycle 10 and supported by a chain stay 64 and a seat stay 62 that extend generally rearward from seat tube 22. Rear wheel assembly 58 includes a tire 64 that is positioned about a rim 66. Rim 66 includes a number of spokes 68 that extend from a hub 70. A rear axle 72 engages hub 70 and rotationally attaches hub 70 to frame assembly 18.

A gear cluster 74 is positioned proximate hub 70 and is operationally connected to a crankset 76. Crankset 76 includes a set of pedals 78 that is operationally connected to a chain 80 via a chain ring or sprocket 82. Operation of pedals 78 rotates chain 80 and communicates a drive force to gear cluster 74. Gear cluster 74 is generally concentrically orientated with respect to rear axle 72 and includes a number of variable diameter gears. Gear cluster 74 is operationally connected to hub 70 of rear wheel assembly 58. As is commonly understood, rider operation of pedals 78 drives chain 80 thereby driving rear wheel 58 which in turn propels bicycle 10.

Understandably, front wheel assembly 36 and rear wheel assembly 58 could be equipped with any of a number of brake system configurations and related components. That is it is understood that one or both of the front and rear wheel assemblies of bicycle 10 be equipped any of a number of brake systems including caliper brake systems which engage the tire rims of rotor brake systems which include a rotor positioned proximate the hub for engaging a hydraulic or other powered caliper. It is further envisioned that bicycle 10 may include any of a number of accessories or accessory mounting systems attached to frame assembly 18. Bicycle 10 could also be equipped with a number of suspension elements or shock absorbers. These shock arresting systems could be integrated into any of frame assembly 18, forks 34, head tube 28, seat and chain stays 62, 64, or the like.

Regardless of the amenities and features of bicycle 10, periodic service and or maintenance of bicycle 10 is inevitable. Servicing of bicycle 10 is more convenient when a technician can manipulate the various parts and assemblies of bicycle 10 without interference from a bicycle supporting surface such as the ground 84. Accordingly, many technicians and riders employ a repair stand 86 that is constructed to secure bicycle 10 and elevate the bicycle 10 above the ground 84.

Figure 3:
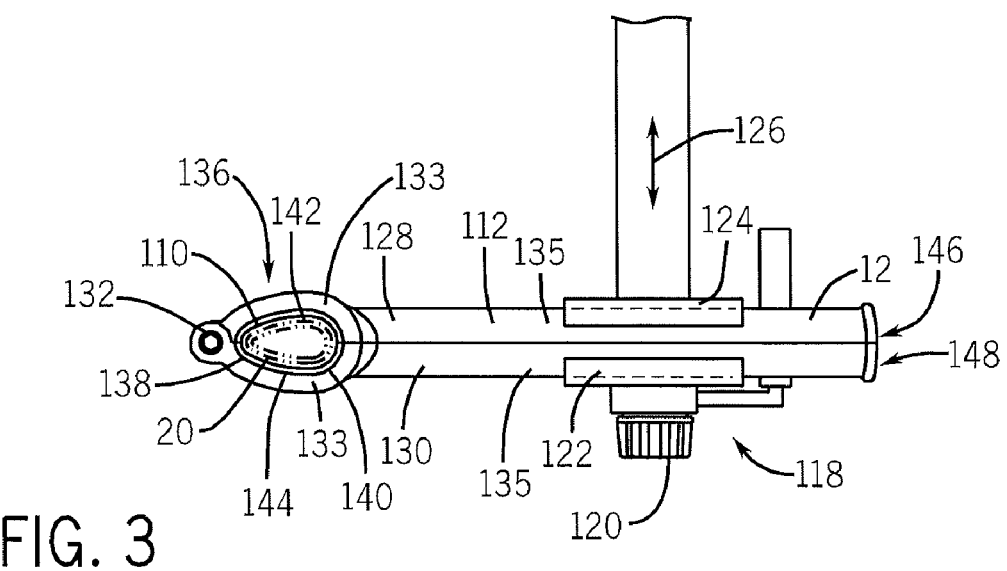
FIG. 3 is a top plan view of the clamp adapter shown in FIG. 1 supporting a bicycle in another type of clamp.

Repair stand 86 includes a body 88 having a number of legs 90, 92, 94 pivotably attached thereto. Body 88 preferably includes a telescopic portion 96 having a clamp head 98 positioned that an end 100 thereof. Clamp head 98 includes a first jaw 102 and a second jaw 104 that are secured to end 100 of body 88 such that the first jaw 102 and second jaw 104 can be cooperatively closed about an object. Preferably clamp head 98 is constructed as a clamp-type of clamp wherein manipulation of a lever or handle displaces one or both of first and second jaws 102, 104 to enclose about an object. Understandably, as shown in FIG. 3, the present invention is usable with a variety of clamp types.

Clamp head 98 is constructed to engage adapter 12 such that the adapter extends generally forward or rearward of seat stem 20. Such a construction ensures that a user can both maintain the desired positioning of adapter 12 relative to stem 20 and manipulate the operator associated with the respective clamping device. Such an orientation also ensures that the gravitational loading of bicycle 10 upon repair stand 86 maintains a center of gravity of the combined repair stand 86 and bicycle 10 at least between the outermost points of leg 90, 92, 94. Preferably, the center of gravity of the loaded repair stand is generally aligned with an axis of body 88. Such a construction and orientation ensures that adapter 12 and bicycle 10 can be efficiently positioned in a variety of clamp configurations while reducing the potential that the loaded repair stand will tip over upon loading or servicing of bicycle 10.

Figure 2:
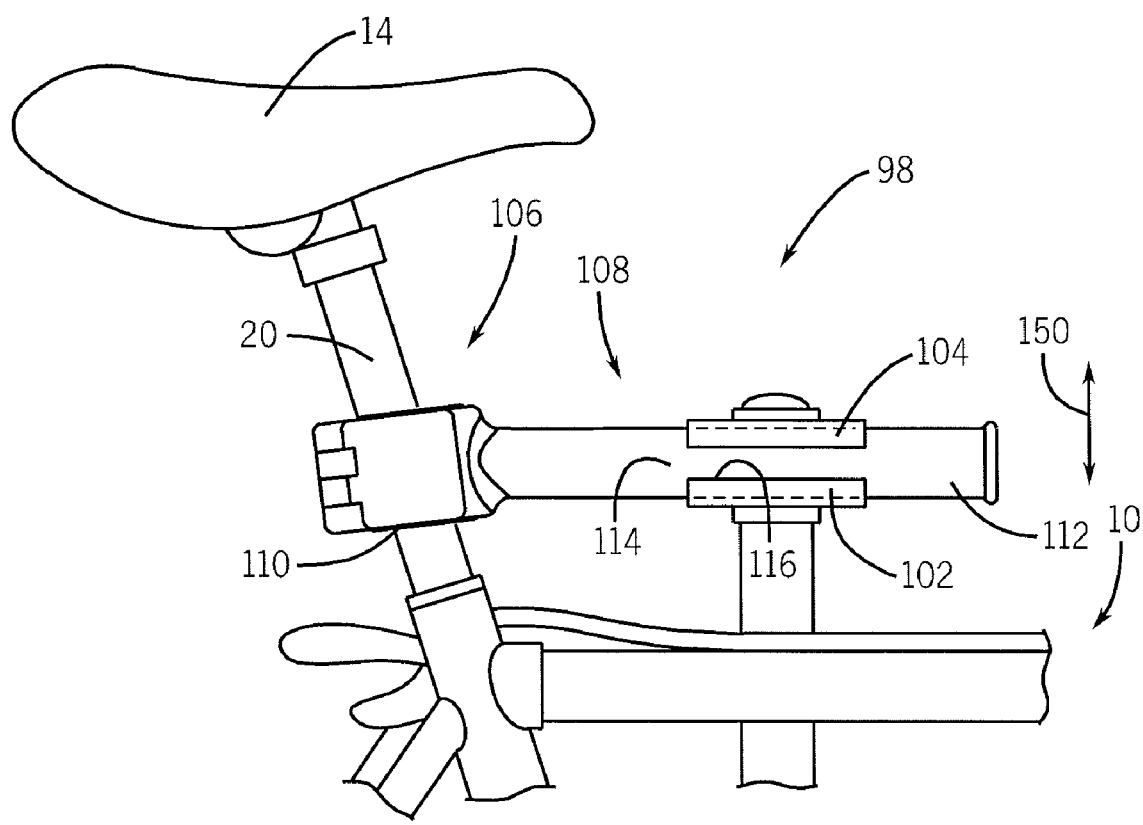
FIG. 2 is a elevation view of the clamp adapter shown in FIG. 1 supporting the bicycle in the clamp.

A shown in FIG. 2, first jaw 102 and second jaw 104 of clamp head 98 operatively engage adapter 12 such that jaws 102, 104 do not directly engage bicycle 10. Adapter 12 includes a first portion or stem portion 106 that is constructed to operationally engage seat stem 20 and a second portion or clamp portion 108 that extends from the stem portion. An optional bushing 110 is disposed between stem portion 106 of adapter 12 and seat stem 20. Preferably, optional bushing 110 is constructed of a rubber or foam-like material with a relatively high coefficient of friction such that adapter 12 fixes the position of stem 20 with respect to repair stand 86 without marring or otherwise damaging the finish of stem 20. Alternatively, an interior surface of stem portion 106 could be constructed or coated with a material having such properties.

Clamp portion 108 of adapter 12 extends from stem portion 106 and is operatively engaged by clamp head 98. Clamp portion 108 includes a contour 112 that is constructed to generally cooperate with a contour 114 associated with an interior surface 116 of jaws 102, 104. Preferably, contour 112 of adapter 12 is configured to operatively interact with a variety of clamp head constructions. As shown in FIG. 3, adapter 12 is constructed to also operatively interact with a screw-type of repair stand clamp 118. Clamp 118 includes a knob 120 that is operationally connected to one or both of a first jaw 122 and a second jaw 124 to vary the distance between the jaws 122, 124. Continued manipulation of knob 120 gradually increases or decreases a clamping force or pressure, indicated by arrow 126, associated with jaws 122, 124. As described further below, adapter 12 is constructed to provide a selected clamping pressure to seat stem 20 independent of the continued tightening of either of clamp head 98 or clamp 118.

Referring to FIG. 3, adapter 12 includes a first arm 128 and a second arm 130 that are connected to be pivotable about a pivot axis or pivot pin 132. Each of first and second arms 128, 130 include a frame section 133 and a clamp section 135. Pivot axis 132 is positioned proximate stem portion 136 of adapter 12. Stem 20, shown in phantom, passes through an opening 138 formed in stem portion 136. Opening 138 has a contour 140 constructed to generally match a contour 142 of stem 20. Optional bushing 110 has a shape or deformable shape that generally corresponds to contour 140 and is constructed to be disposed between stem 20 and an interior surface 144 of stem portion 136. Although stem contour 142 and adapter contour 140 are shown as having a generally aerodynamic, teardrop, or airfoil shape, other shapes such as round, elliptical, or airfoil shapes more pronounces than that shown, are envisioned and within the scope of the claims. That is, it is envisioned that contour 140 of adapter 12 be provided in a number of configurations to operationally engage various frame section or seat stem profiles or cross-sections. It is further envisioned that contour 140 be configured to engage a section of a seat stem as shown or any other desired structure of bicycle 10.

Each clamp section 135 of first arm 128 and second arm 130 includes an interface edge 146, 148, respectively. The interface edge 146 of first arm 128 is constructed to operationally engage the interface edge 148 of second arm 130 such that clamp sections 135 define a maximum clamping pressure 126 independent of continued operation of knob 120. Furthermore, adapter 12 is operable with clamps which generate clamping pressure in the direction indicated by arrow 126 and clamps which generate a clamping pressure in other directions, such as a direction generally normal thereto, as shown by the clamping pressure indicated by arrow 150 as shown in FIG. 2. Such a construction allows adapter 12 to operably interact with a variety of repair stand configurations.

As shown in FIGS. 4 and 5, adapter 12 is capable of a closed orientation 151, as shown in FIG. 4, and an open orientation 152, as shown in FIG. 5. As shown in FIG. 4, when adapter 12 is closed 151, interface edge 146 of clamp section 135 of first arm 128 and second arm 130 are generally aligned and in abutting engagement to define a maximum closed position of frame sections 133 of first arm 128 and second arm 130. As shown in FIG. 5, adapter 12 can be opened 152 by pivoting first arm 128 and/or second arm 130 about pivot axis 132 such that an opening or gap 154 is formed between interface edge 146 of first arm 128 and interface edge 148 of second arm 130. Gap 154 allows adapter 12 to translate in a direction, indicated by arrow 156, relative to stem 20. Such a configuration allows adapter 12 to be quickly and efficiently engaged and disengaged from stem 20 or other desired structure of bicycle 10.

Figure 6:
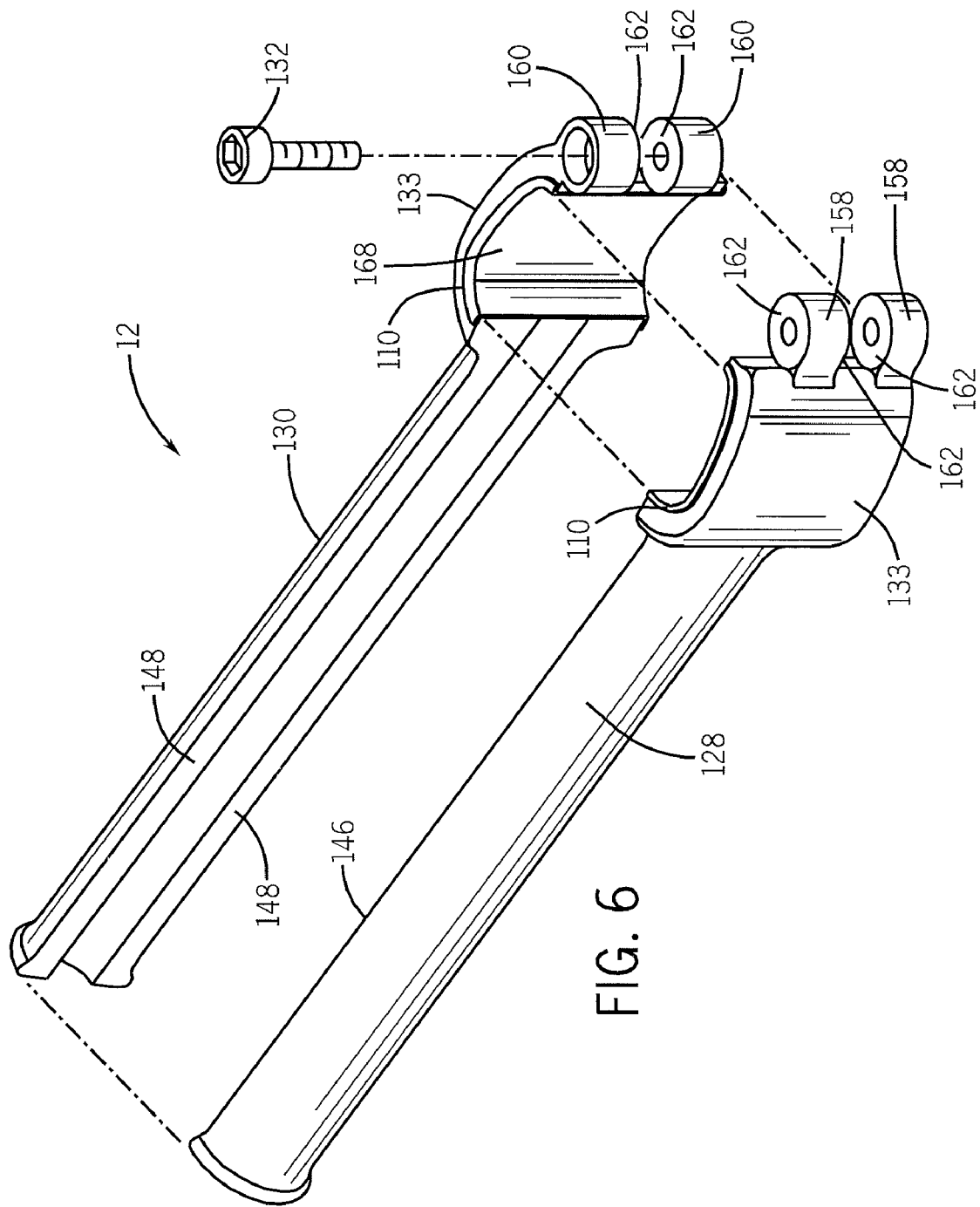
FIG. 6 is a partial exploded view of the bicycle clamp adapter shown in FIG. 1.

Referring to FIG. 6, a number of hinge barrels 158, 160 extend from each frame section 133 of first and second arms 128, 130, respectively. Hinge barrels 158 of first arm 128 are constructed to generally align with hinge barrels 160 of second arm 130. Pivot pin 132 is constructed to operatively engage hinge barrels 158, 160 thereby pivotably connecting first arm 128 and second arm 130. Each of hinge barrels 158, 160 include exposed faces 162 which cooperatively engaged exposed faces 162 of adjacent hinge barrels 158, 160. Each of exposed faces 162 has a generally planar surface such that the interaction between adjacent exposed faces 162 provides generally coplanar movement of first arm 128 relative to second arm 130. Such a construction ensures that interface edge 146 of first arm 128 and interface edge 148 of second arm 130 are generally aligned when adapter 12 is closed 151. Such a construction further ensures that adapter 12 determines the maximum clamping pressure that can be imparted to stem 20 regardless of continued tightening of the associated repair stand clamp and independent of the orientation of the jaws of the repair stand clamp to the arms 128, 130 of adapter 12.

As shown in FIGS. 5 and 6, optional bushing 110 includes a first portion 166 and a second portion 168. First portion 166 is constructed snuggly engage frame section 133 of first arm 128 and second portion 168 is constructed to snugly engage frame section 133 of second arm 130. Such a construction allows adapter 12, with bushing 110 positioned therein, to be removably positioned and engaged with bicycle 10. Such a construction provides a clamp adapter that can be quickly and efficiently implemented, does not jeopardize the finish, quality, or structure integrity of the bicycle component being clamped, and maintains the gravitational orientation of the bicycle with respect to a repair stand.

Therefore, a bicycle clamp adapter according to one embodiment of the invention includes a first arm and a second arm. The second arm is pivotably connected to the first arm and each first arm and second arm has a frame section and a clamp section. The frame sections are constructed to cooperate to grip a frame portion of a bicycle and the clamp sections are constructed to engage a clamp. The clamp sections are also constructed to define a maximum grip pressure of the frame sections.

A bicycle support device according to another embodiment includes a first portion that is constructed to engage a seat post of a bicycle and a second portion that is constructed to engage a bicycle clamp. The first portion and the second portion are connected such that when the first portion is engaged with the seat post, the second portion extends in a crossing direction from an axis of the seat post. Such a construction allows a user to conveniently manipulate the position of the bicycle with the support device.

A method of forming a bicycle repair stand adapter according to another embodiment includes forming an adapter with a number of sections. The adapter includes a first section that is formed with a contour that generally matches a contour of a portion of a bicycle frame and a second section that is formed to extend from the first section and constructed to be engaged by a repair clamp. A pivotable link is formed such that the first and second sections can be opened to allow the bicycle frame to pass therebetween and closed to generally surround the bicycle frame.

The present invention has been described in terms of the preferred embodiment, and it is recognized that equivalents, alternatives, and modifications, aside from those expressly stated, are possible and within the scope of the appending claims.

What is claimed is:

1. A bicycle clamp adapter in combination with a bicycle, the combination comprising:
   the bicycle comprising,
      a frame; and
      a plurality of wheels supported on the frame;
   the bicycle clamp adapter comprising,
      a first arm;
      a second arm pivotably connected to the first arm; and
      each of the first arm and the second arm having a frame section and a clamp section, the frame sections constructed to cooperate to grip a portion of the frame of the bicycle and the clamp sections constructed to engage a clamp of a bicycle repair stand and define a maximum grip pressure of the frame sections so as to restrain the bicycle frame without distorting the frame of the bicycle enclosed by the frame sections.

2. The combination of claim 1 wherein the bicycle clamp adapter further comprises a hinge formed at an end of each of the first arm and the second arm and constructed to engage a pivot pin.

3. The combination of claim 2 wherein the first arm and the second arm of the bicycle clamp adapter rotate about the pivot pin in a clam shell fashion.

4. The combination of claim 1 wherein the bicycle clamp adapter further comprises a bushing having a contour that generally matches a contour of the frame sections of the first and second arms.

5. The combination of claim 4 wherein the contour of the frame sections of the bicycle clamp adapter are each teardrop shaped.

6. The combination of claim 1 wherein the maximum grip pressure is less than a pressure required to mar the frame portion.

7. The combination of claim 1 wherein the frame portion of the bicycle is a carbon fiber material.

8. A bicycle support device in combination with a bicycle repair stand, the combination comprising:
   the bicycle repair stand comprising,
      a body;
      a plurality of legs pivotably attached to the body and supporting the body on the ground; and
      a clamp coupled to the body;
   the bicycle support device comprising,
      a first portion constructed to engage a seat post of a bicycle;
      a second portion constructed to engage the clamp; and
      wherein the first portion and second portion are connected such that when the first portion is engaged with the seat post, the second portion extends in a crossing direction from an axis of the seat post and defines a maximum compression of the first portion about the seat post when the clamp of the repair stand is enclosed thereabout.

9. The combination of claim 8 wherein the crossing direction is generally perpendicular from the seat post in one of a forward or rearward direction with respect to the bicycle.

10. The combination of claim 8 wherein the bicycle support device further comprises a hinge such that the first portion and the second portion are movable between an open orientation wherein the seat post can pass therebetween and a closed orientation wherein the seat post is substantially encircled by the first portion and the second portions abut one another.

11. The combination of claim 10 wherein each of the first portion and the second portion of the bicycle support device include a first half and a second half that are generally mirror images of one another, respectively.

12. The combination of claim 11 wherein the hinge includes a pair of tabs extending from an end of each of the first half and the second half of the first portion.

13. The combination of claim 11 wherein each of the first half and the second half of the second portion includes a face constructed to be engaged to define a fully closed position of the first portion associated with the maximum compression of the first portion.

14. The combination of claim 8 wherein the first portion has a generally airfoil shaped contour and the second portion has a generally round contour.

15. The combination of claim 8 further comprising a pliable member constructed to be disposed between the first portion and the seat post.

* * * * *